United States Patent
Wan

(10) Patent No.: US 9,003,277 B2
(45) Date of Patent: Apr. 7, 2015

(54) METHOD AND SYSTEM FOR PRESENTING WEB PAGE RESOURCES

(75) Inventor: Yong Wan, Beijing (CN)

(73) Assignee: Beijing Sogou Technology Development Co., Ltd., Beijing (CN)

(*) Notice: Subject to any disclaimer, the term of this patent is extended or adjusted under 35 U.S.C. 154(b) by 1012 days.

(21) Appl. No.: 13/098,455

(22) Filed: Apr. 30, 2011

(65) Prior Publication Data

US 2011/0202828 A1 Aug. 18, 2011

Related U.S. Application Data

(63) Continuation of application No. PCT/CN2009/074932, filed on Nov. 13, 2009.

(30) Foreign Application Priority Data

Nov. 14, 2008 (CN) .......................... 2008 1 0226378

(51) Int. Cl.
G06F 17/30 (2006.01)
(52) U.S. Cl.
CPC .............................. G06F 17/30905 (2013.01)
(58) Field of Classification Search
CPC ................................... G06F 17/30; G06F 1/16
USPC ...................................................... 715/234
See application file for complete search history.

(56) References Cited

U.S. PATENT DOCUMENTS

| 7,013,322 B2* | 3/2006 | Lahr .............................. 709/201 |
| 7,962,843 B2* | 6/2011 | Milic-Frayling et al. ..... 715/206 |
| 2009/0249244 A1* | 10/2009 | Robinson et al. ............. 715/781 |

FOREIGN PATENT DOCUMENTS

| CN | 200810126823.3 | 11/2005 |
| CN | 200710090660.3 | 11/2007 |
| CN | 20071016610.8 | 5/2008 |
| WO | WO03040955 A1 | 5/2003 |

* cited by examiner

*Primary Examiner* — Kavita Padmanabhan
*Assistant Examiner* — Tionna Burke
(74) *Attorney, Agent, or Firm* — Anova Law Group, PLLC

(57) ABSTRACT

A method is disclosed for presenting specific resources on a computer having a web browser. The method includes accessing by the web browser a specific resource related to an original web page from a web server, obtaining attribute information of the specific resource, and identifying the specific resource contained in the original web page based on the obtained attribute information of the specific resource. Further, the method includes obtaining an independent window being independent from at least a web page window displaying the original web page, and presenting the identified specific resource in the independent window.

38 Claims, 5 Drawing Sheets

FIG. 5A                    FIG. 5B

METHOD AND SYSTEM FOR PRESENTING WEB PAGE RESOURCES

CROSS-REFERENCES TO RELATED APPLICATIONS

This application claims the priority of PCT patent application no. PCT/CN2009/074932, filed on Nov. 13, 2009, which claims the priority of Chinese patent application no. 200810226378.8, filed on Nov. 14, 2008, the entire contents of all of which are incorporated herein by reference.

FIELD OF THE INVENTION

The present invention generally relates to web browser technologies and, more particularly, to the methods and systems for presenting web page resources.

BACKGROUND

With rapid progresses in the multimedia technologies, web page resources can now include various types, such as text, picture, audio, animation, and video. By appropriately combining and displaying these web page resources, various web pages containing a variety of types of information may be displayed to users.

However, when displaying a web page resource related to a particular web page, conventional displaying technology often directly displays the web page resource at a fixed position in the particular web page. For example, when a user watches a video from a web page, the video usually is played to the user from the web page at a location where the video is embedded. Thus, the video resource is displayed together with other resources within the web page. Such display format may only allow the user to carry out very limited operations, such as pause, play, and maximize, and the user may be unable to perform other personal operations according to the user's own interests. Also for example, certain audio resources may be used as web page background music, and usually there is no audio player in the web page. Thus, the user cannot see information about the background-music audio resources, and certainly cannot perform personal operations on the audio resources.

The disclosed methods and systems are directed to solve one or more problems set forth above and other problems.

BRIEF SUMMARY OF THE DISCLOSURE

One aspect of the present disclosure includes a method for presenting specific resources on a computer having a web browser. The method includes accessing by the web browser a specific resource related to an original web page from a web server, obtaining attribute information of the specific resource, and identifying the specific resource contained in the original web page based on the obtained attribute information of the specific resource. Further, the method includes obtaining an independent window being independent from at least a web page window displaying the original web page, and presenting the identified specific resource in the independent window.

Another aspect of the present disclosure includes a computer-readable medium containing executable computer programs. When executed by a computer having a web browser, the computer programs perform a method for presenting specific resources on the computer. The method includes accessing by the web browser a specific resource related to an original web page from a web server, obtaining attribute information of the specific resource, and identifying the specific resource contained in the original web page based on the obtained attribute information of the specific resource. Further, the method includes obtaining an independent window being independent from at least a web page window displaying the original web page, and presenting the identified specific resource in the independent window.

Other aspects of the present disclosure can be understood by those skilled in the art in light of the description, the claims, and the drawings of the present disclosure.

BRIEF DESCRIPTION OF THE DRAWINGS

FIG. 5A illustrates an exemplary independent presenting unit with the disclosed embodiments;

FIG. 5B illustrates an exemplary independent presenting unit with the disclosed embodiments;

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
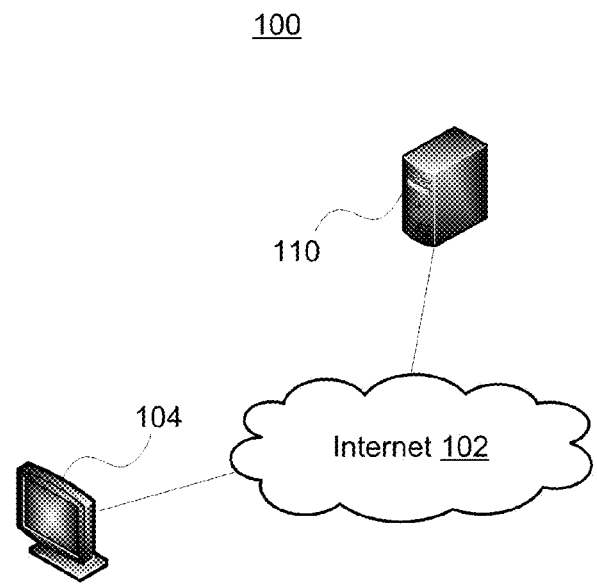
FIG. 1 illustrates an exemplary network environment incorporating certain aspects of the disclosed embodiments.

FIG. 1 illustrates an exemplary network environment incorporating certain aspects of the disclosed embodiments. As shown in FIG. 1, network environment 100 may include the Internet 102, a user computer 104, and a server 110. Other components may be added and certain devices may be removed without departing from the principles of the disclosed embodiments.

The Internet 102 may include any private and public computer networks interconnected using the standard transport control protocol/internet protocol (TCP/IP). Internet 102 may carry a large number of services over IP, such as the interlinked hypertext documents of the World Wide Web (WWW) and electronic mail (or email). Internet 102 may connect a large number of websites.

Figure 2:
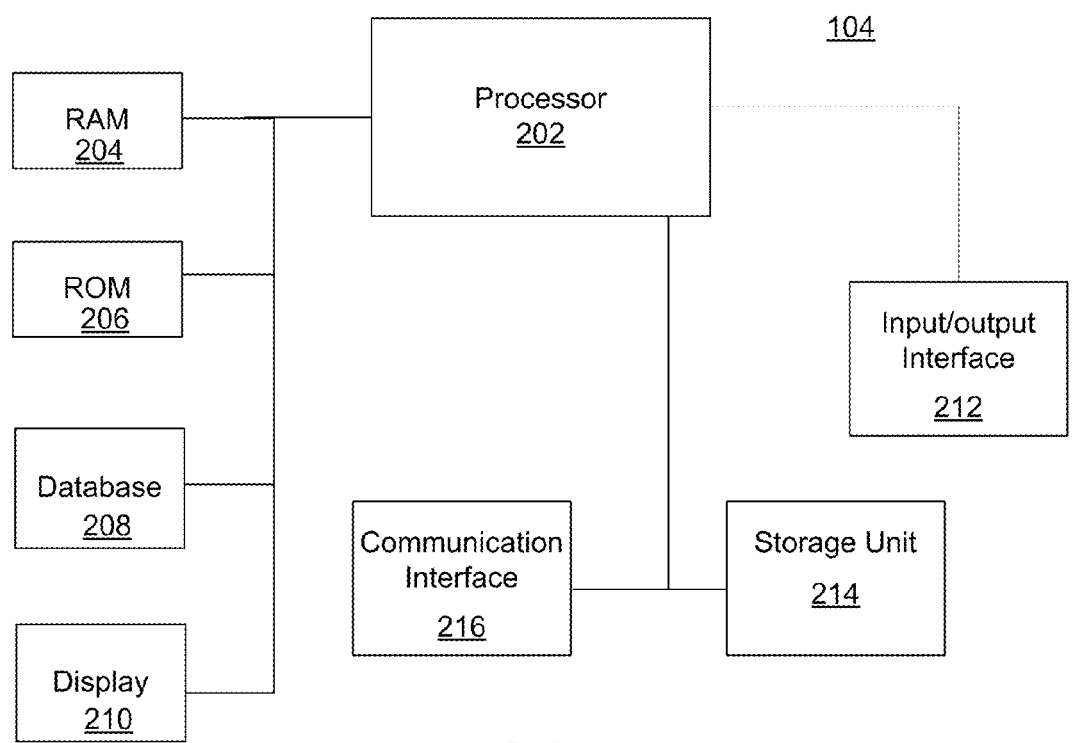
FIG. 2 illustrates a block diagram of an exemplary user computer consistent with the disclosed embodiments.

Server 110 may include any appropriate computer servers, software, and databases so as to provide various websites and web pages. Further, user computer 104 may include any appropriate types of computers operated by a user or users to access web-based or local web pages. For example, user computer 104 may include a desktop computer, a notebook computer, a tablet, a smart phone, and other types of computing platforms and software programs. FIG. 2 shows a block diagram of an exemplary user computer 104.

As shown in FIG. 2, user computer 104 may include a processor 202, a random access memory (RAM) unit 204, a read-only memory (ROM) unit 206, a database 208, a display 210, an input/output interface unit 212, a storage unit 214, and a communication interface 216. Other components may be added and certain devices may be removed without departing from the principles of the disclosed embodiments.

Processor 202 may include any appropriate type of graphic processing unit (GPU), general-purpose microprocessor, digital signal processor (DSP) or microcontroller, and application specific integrated circuit (ASIC), etc. Processor 202 may execute sequences of computer program instructions to perform various processes associated with user computer 104. The computer program instructions may be loaded into RAM 204 for execution by processor 202 from read-only memory 206.

Database 208 may include any appropriate commercial or customized database to be used by user computer 104, and may also include query tools and other management software for managing database 208. Display 210 may include any appropriate computer monitor, such as an LCD monitor. Further, input/output interface 212 may be provided for a user or users to input information into user computer 104 or for the user or users to receive information from user computer 104. For example, input/output interface 212 may include any appropriate input device, such as a remote control, a keyboard, a mouse, a microphone, a video camera or web-cam, an electronic tablet, voice communication devices, or any other optical or wireless input devices. Input/output interface 212 may include any appropriate output device, such as a speaker, or any other output devices.

Storage unit 214 may include any appropriate storage device to store information used by user computer 104, such as a hard disk, a flash disk, an optical disk, a CR-ROM drive, a DVD or other type of mass storage media, or a network storage. Further, communication interface 216 may provide communication connections such that user computer 104 may be accessed remotely and/or communicate with other systems through computer networks or other communication networks via various communication protocols, such as TCP/IP, hyper text transfer protocol (HTTP), etc.

Returning to FIG. 1, user computer 104 may access various web pages from server 110 through Internet 102 or from local storages. The various web pages may contain one or more specific resources (or web page resources) so that the user computer 104 may access the specific resources from server 110 by the browser. Specific resources, as used herein, may refer to any media contents capable being used in a web page, including single-media resources and/or multi-media resources. The multi-media resources can be interactive multi-media resources. More specifically, such specific resources may include, but not limited to, any one of video resources, audio resources, image resources, animation (including animated GIF or flash animation, etc.), text resources, and any combinations thereof. Of course, the specific resources can also be certain resources created in the future that are related to a web page. The video resources may be different from the animation resources in that the video resources may include streaming media files while the animation resources may be similar to image resources, such as certain flash ads, etc. Any other or future types of contents or resources may also be included.

Figure 3:
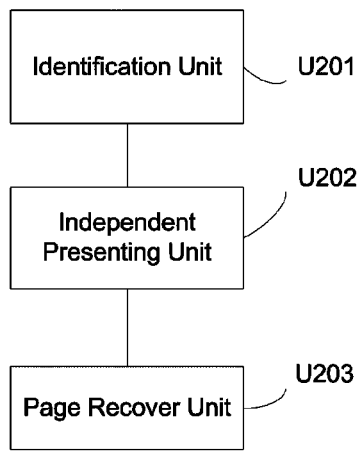
FIG. 3 illustrates an exemplary web page resource presentation module consistent with the disclosed embodiments.

In operation, user computer 104 may be configured to access the web pages and to identify and present the specific resources related to one or more web pages to a user or users of user computer 104. More particularly, user computer 104 may use certain software and/or hardware to present the various specific resources to the user. For example, user computer 104 may be configured to present the video resources and audio resources, i.e., to play the video resources and audio resources, in a special window or windows. User computer 104 may also be configured to present the image resources, animation resources, and text resources, i.e., to display the image resources, animation resources, and text resources, in a special window or windows. FIG. 3 illustrates an exemplary specific resource presentation module 300 consistent with the disclosed embodiments.

As shown in FIG. 3, presentation module 300 may include an identification unit U201, an independent presenting unit U202, and a page recover unit U203. Other units may also be included. Identification unit U201 may identify a variety of specific resources. For example, identification unit U201 may identify audio resources including web page background music, music played through a player embedded in a web page, and music hyper links in a web page, etc. The term specific resource may be interchangeably used with the term resource in this disclosure.

More specifically, when identifying a specific resource, identification unit U201 may first obtain attribute information of the specific resource contained in a web page, such as type information of the specific resource. Identification unit U201 may use various ways to obtain the type information of the specific resource. After identification unit U201 obtains the type information, the type information may be used to identify the specific resource.

For example, when a browser loads a web page, the browser may send a request to server 110 for loading a specific resource. The request may include information about the resource such as uniform resource location information. The uniform resource location information may be used by server 110 to find the corresponding specific resource. In practice, the uniform resource location information may include a uniform resource identifier (URI), which may be a uniform resource locator (URL) or a uniform resource name (URN). For simplicity purposes, the URL is used as the uniform resource location information to describe various embodiments in this disclosure. Any other appropriate types of resource location information may be used.

The browser may get a resource package corresponding to a web page before loading the web page. The resource package may contain one or more URLs of resources to be downloaded. With respect to certain resources, such as image, text, background music and other resources, the browser may directly send server 110 the request for downloading these resources using the corresponding URLs in the resource package. However, for certain other resources, such as audio or video resources to be played by a media player embedded in the web page, the request for downloading such resources may need to be sent by the embedded media player instead of the browser. That is, the embedded media player may send the request containing the appropriate URLs in the resource package. Further, a media player may include any appropriate type of software or computer player.

Thus, for such resources to be played by the embedded media player, the resource package obtained by the browser before loading the web page including such resources includes information on corresponding media player for playing such resources, such as a URL of the media player, the ID and source of the audio or video resource, etc. The browser may first download the embedded media player from server 110 based on the URL of the media player. After the media player is loaded, the browser may pass the information of the audio or video resource (e.g., ID and source) to the embedded media player, and the embedded media player may compose a URL of the audio or video resource based on the ID and source, etc., information and then send server 110 the request to download the audio and/or video resource based on the URL of the audio and/or video resource.

Figure 4A:
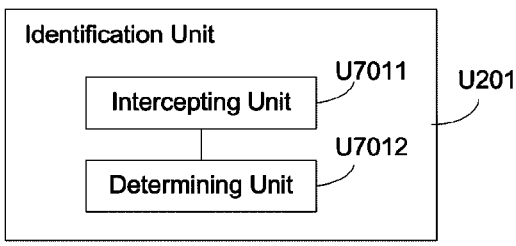
FIG. 4A illustrates an exemplary identification unit consistent with the disclosed embodiments.

Because the request to server 110 for downloading the web resources, whether from the browser or from the embedded media player, often contains information about the corresponding specific resources, identification unit U201 may further include an intercepting unit U7011 and a determining unit U7012 to obtain and identify the specific resources, as shown in FIG. 4A. Intercepting unit U7011 may intercept the request sent by the browser to server 110 to obtain the URL or URLs associated with one or more specific resources. For example, interception unit U7011 may use functions of the operating system of user computer 104 to copy or inspect part or all of the contents of the request sent to server 110.

After obtaining the URL, determining unit U7012 of identification unit U201 may check a suffix of the URL. Because the suffix can usually indicate the type of the resource associated with the URL, determining unit U7012 may analyze the suffix of the URL to determine the type of the resource. For example, when determining unit U7012 finds the suffix of the URL is 'jpg,' determining unit U7012 may determine that the resource is an image resource. Similarly, determining unit U7012 may determine the video resource, audio resource, image resource, animation resource, and text resource based on the suffices of the corresponding URLs.

As mentioned above, for certain specific resources such as video and audio resources, because the request for downloading such resources may be sent by the embedded media player, intercepting unit U7011 may intercept the request sent by the embedded media player to obtain the URL or URLs associated with the resources.

However, under certain circumstances, the browser or embedded media player may send server 110 a request including an arbitrary URL suffix for downloading certain resources. Such arbitrary URL suffix normally does not impact operation of the browser or other software on user computer 104. For example, an image resource normally has a URL with the suffix of 'jpg,' but the browser may send out the resource request including the URL of the image resource with a suffix of '123,' and the browser can still download the image resource from server 110 and display the downloaded image resource. However, determining unit U7012 may be unable to determine the type of the image resource based on the URL suffix of '123' or other arbitrary suffix.

Thus, intercepting unit U7011 may intercept a response from server 110 corresponding to the request sent by the browser or the embedded media player. The response may also contain attribute information of the specific resources. For example, the response may include a response header and data contents (i.e., a binary data stream of the resource file requested by the browser). By analyzing certain portion or portions of the data contents, determining unit U7012 may be able to determine the type of resource file sent by server 110. For instance, a 'gif' image may be determined if the first six bytes of the data contents are 'GIF89a,' and a 'Flv' format is determined if the first three bytes of the data contents are 'FLV,' etc. Therefore, the data portion of the server response may provide accurate information to identify the type of the requested resource. Other file formats may also be determined similarly.

Further, identification unit U201 may determine whether to intercept the request to server 110 or the response from server 110 or both. For example, identification unit U201 may be configured to identify the type of the resource using the request to server 110 from the browser first, and using the response from server 110 when the request fails to provide the type information.

Figure 4B:
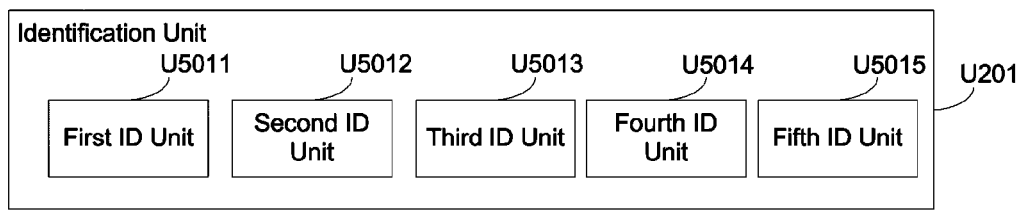
FIG. 4B illustrates another exemplary identification unit consistent with the disclosed embodiments.

In addition, the different types of specific resources may be related to one or more web pages in different ways, identification unit U201 may include various components to identify the specific resources related to various types of web pages and configurations. For example, as shown in FIG. 4B, identification unit U201 may include a first identification unit U5011, a second identification unit U5012, a third identification unit U5013, a fourth identification unit U5014, and a fifth identification unit U5015. Other components may also be included.

First identification unit U5011 may be configured to identify a specific resource requested directly by an original web page, as explained above. That is, the specific resource identified by first identification unit U5011 is contained in the original web page. Second identification unit U5012 may be configured to identify a specific resource requested by a sub-page of the original web page. That is, the specific resource identified by second identification unit U5012 is contained in the sub-page of the original web page. A sub-page may refer to a child web page (window) of a current web page (window).

Further, third identification unit U5013 may be configured to identify a specific resource transferred at the back-end of the original web page, such as the audio and/or video resources played by embedded media players of the requested web pages. That is, the specific resource identified by third identification unit U5013 is back-end transferred in the original web page. In addition, fourth identification unit U5014 may be configured to identify a specific resource pointed to by a hyperlink in the original web page. That is, the specific resource identified by fourth identification unit U5014 is pointed to by a hyperlink in the original web page. Further, fifth identification unit U5015 may be configured to identify one or more specific resources contained in other web page(s) having a same theme or with a same subject as the original web page. That is, the specific resources identified by fifth identification unit U5015 are contained web pages having the same theme or with the same subject as in the original web page.

It is understood that presentation module 300 and various components, including identification unit U201 and identification units U5011-U5015, may be implemented software, hardware, or a combination of software and hardware. For example, identification unit U201 and identification units U5011-U5015 may be implemented as part of software application programs that run on user computer 104, such as a web browser, a local resource browser, or both. Identification unit U201 (e.g., identification units U5011-U5015) may be invoked by the user of user computer 104 or may be invoked by a web browser component automatically.

In addition identifying the type of the specific resource with various relationship to the original web page, identification unit U201 (e.g., identification units U5011-U5015) may identify other information of the specific resource related to a web page. For example, identification unit U201 may identify the URL of the resource by, as previously explained, intercepting the request for downloading the resource sent to the server 110 from the browser or from an embedded media player.

After the various specific resources are identified by Identification unit U201, as shown in FIG. 3, independent presenting unit U202 may present the identified specific resource or resources in an independent window. An independent window, as used herein, may refer to a window that is independent from a web page window containing the identified specific resource, such as a window with the desktop as the parent window, a dialog-box form floating window (e.g., floating toolbar windows of some applications can be dragged anywhere on the desktop of user computer 104), or a desktop window. In other words, operations on other windows such as the original web page window and the browser window might not affect the independent window. For example, closing of the original web page window or the browser window does not closing the independent window.

Of course, independent presenting unit U202 may configure the independent window to control certain operations of the independent window, such as closing. For example, independent presenting unit U202 may recognize a main program such that, when the main program exits, the main program may notify all windows associated with the main program, including any independent window, to close. However, completion of other programs or closure of other windows does not cause the independent window to close. That is, independent presenting unit U202 may specify that closure of certain windows or types of windows does not impact the independent window.

Independent presenting unit U202 may present the identified specific resources in the independent window according to the types of the specific resources. For example, as shown in FIG. 5A, independent presenting unit U202 may include a play unit U7025 configured to play certain identified specific resources, such as audio or video resources. Independent presenting unit U202 may also include a display unit U7026 configured to display certain other identified specific resources, such as image, animation, or text resources. Other presenting mechanisms and resource types may also be included.

Further, when presenting the specific resources in an independent window, independent presenting unit U202 may present only the identified or specified specific resources without presenting other contents. That is, contents presented in the independent window by independent presenting unit U202 are limited as the specific resource itself. For example, independent presenting unit U202 or play unit U7025 may play only a video resource in the independent window without playing or displaying other contents. In comparison, an embedded media player in the original web page containing the video resource may play the video resource together with other contents, such as images, etc. Alternatively, independent presenting unit U202 may also present certain other contents in addition to the identified or specified specific resource, as selected by the user or software applications.

Independent presenting unit U202 may generate the independent window in a variety ways, and may also present the specific resources in various ways in the independent window. In certain embodiments, as shown in FIG. 5B, independent presenting unit U202 may include a creation unit U3021 and a presentation processing unit U3022, which may further include a first parent window change unit U30221 and a second parent window change unit U30222.

After a specific resource is identified by identification unit U201, creation unit U3021 is configured to create an independent window. For example, creation unit U3021 may create a window with the desktop window as the parent window or as a dialog-box form window (which also has the desktop window as the parent window). The desktop window may refer to a default or main window of the computer display of user computer 104 and the desktop window generally cannot be closed during normal operation.

After the independent window is created, presentation processing unit U3022 may process the independent window and/or the original web page window to present the identified resources in the independent window. For example, first parent window change unit U30221 may change the parent window of the original web page window containing the identified specific resource into the independent window, and may also adjust size, position, and/or contents of the independent window and/or the original web page window. For instance, the independent window may be adjusted to match the identified resource. That is, first parent window change unit U30221 may change the parent window of the original web page window from a browser window to a desktop window, and may also re-arrange the contents and formats of the original web page window (or simply referred as the web page window).

More specifically, when the parent window of the web page window containing the identified resource is initially a browser window, first parent window change unit U30221 may change the parent window of the web page window to the created independent window using certain functions from operating system (OS), such as a 'set parent' function. Thus, the contents of the web page containing the identified resource can be shown in the independent window. Of course, to present only the identified resource, the size of the independent window may be relatively small. It may be desired to move the web page window according to the location of the identified resource such that only the identified resource is presented in the independent window.

For example, to determine a location to move the web page window, first parent window change unit U30221 may analyze front page elements to determine the coordinates of a starting point and an end point of the identified or specific resource. Further, because the web page window is now a child window of the independent window, moving the web page window does not change the position of the independent window. Therefore, the web page window may be moved to change the relative positions between the independent window and the web page window such that the identified resource in the web page window can be moved to the independent window to be presented. However, because the independent window is the parent window of the web page window, moving the independent window may cause the web page window to move together with the independent window as to maintain the relative positions between the independent window and the web page window. Any other appropriate mechanisms may be used to arrange the relative positions between the independent window and the web page window so as to present the identified resource or resources in the independent window.

When first parent window change unit U30221 is used to change the parent window of the web page window into the independent window, the user of user computer 104 may see the resulted window as if the original web page window disappeared. For example, when a video resource is presented, the user may see only the video resource in the independent window, and cannot see any contents surround the video resource in the original web page window. Thus, for a multiple tag browser, the browser will no longer have the original page tab, and when the independent window is closed, the original web page window is also closed along with the independent window.

Further, when the identified resource is of a window type, such as a flash or audio and video played in an embedded player, also called a resource window, second parent window change unit U30222 may directly change the parent window of the resource window to the independent window. The parent window of the resource initially may be the original web page window containing the identified window-type resource. Because the parent window of the resource window is the original web page window containing the identified resource, and the identified resource itself is presented in the window form, second parent window change unit U30222 may change the parent window of the resource window to the independent window, and present the identified resource in the independent window.

For example, with respect to the audio and/or video resource played in the media player embedded in the web page window, the media player window is the resource window for the identified audio and/or video resource. When the audio and/or video resource is played in the original web page by the embedded media player, the parent window of the media player window is the original web page itself. Thus, to present the audio and/or video resource in the independent window, second parent window change unit U30222 changes the parent window of the media player window to the independent window and then present the identified audio and/or video resource with certain adjustments to the independent window, the media player window, and/or the original web page window.

When second parent window change unit U30222 is used to change the parent window of the resource window to the independent window, the user of user computer 104 may see the resulted window as if the identified resource disappeared from the original web page window. Of course, the original web page window is not closed. For a multiple-tag browser, the browser may still have the original page tab, and the other contents of the original web page window may also exist. Further, when the independent window is closed, although the original web page window is not closed, the user cannot see the identified resource previously presented in the independent window.

Whether first parent window change unit U30221 or second parent window change unit U30222 is used to set up or process the independent window, the identified resource can be presented in the independent window without reloading the web page. In other words, the identified resource is not changed, and only the presentation format is changed. Thus, an identified specific resource, even a dynamic resource, may be presented in the independent window synchronized with the original web page. For example, when a video is being played in the original web page, the parent window of the resource window playing the video may be changed into the independent window, and the video can then continue to be presented in the independent window without interruption. Further, because no reloading is needed, performance of user computer 104 may be less affected, and the user can drag the independent window to any location on the computer display to view the contents of the independent window.

Figure 5C:
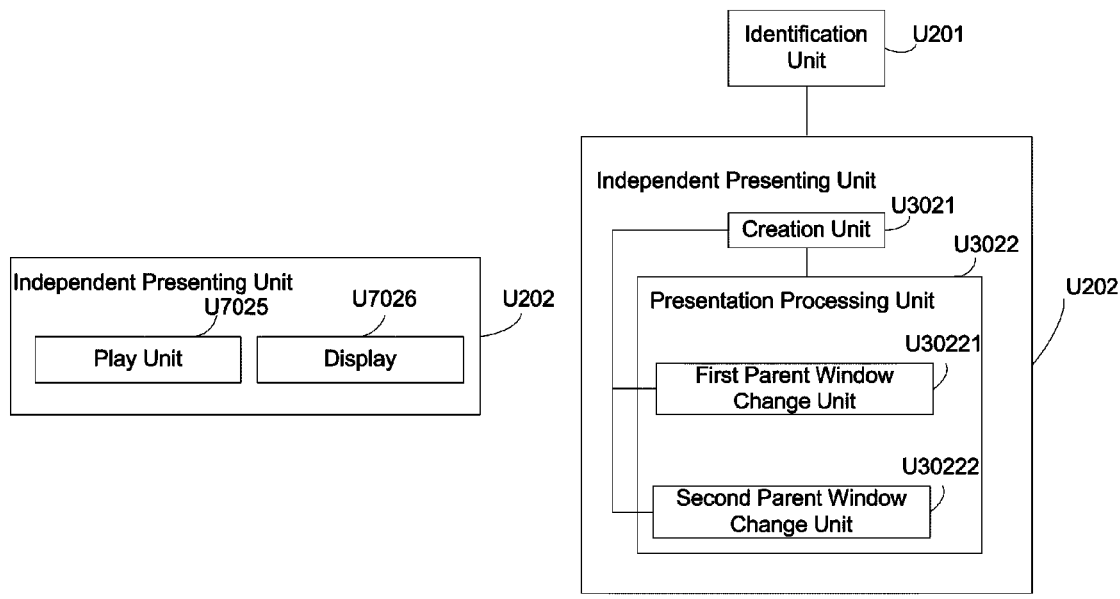
FIG. 5C illustrates an exemplary independent presenting unit with the disclosed embodiments.
Figure 5C:
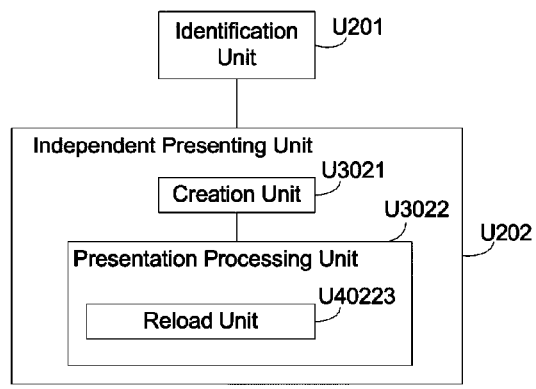

Returning to FIG. 3, in certain embodiments, independent presenting unit U202 may also support presenting the identified specific resources in the independent window after reloading the identified resources. FIG. 5C illustrates an exemplary independent presenting unit U202 consistent with the disclosed embodiments.

As shown in FIG. 5C, independent presenting unit U202 includes a creation unit U3021 to create an independent window after the specific resources are identified. Independent presenting unit U202 may also include a presentation processing unit U3022, which further includes a reload unit U40223.

In operation, after creating the independent window, presentation processing unit U3022 may create a temporary browser navigation page window with the independent window as the parent window. That is, when the independent window is created, the independent window is an empty window without navigation functionalities. Because such window may be unable to reload web pages, the temporary browser navigation window is created with the independent window as the parent window to add the navigation functionalities to the independent window, such as reloading web pages.

Further, reload unit U40223 may reload the original web page containing the identified resource into the independent window based on the uniform resource location information (e.g., a URL) of the original web page. Further, reload unit U40223 may adjust the sizes and relative positions of the navigation page window and the independent window such that only the identified resource is presented in the independent window.

When the reloading is completed, the independent window may be shown as a reduced-size browser window loaded with the original web page, and only upper-left corner of the web page may be visible in the reduced-size browser window, with scroll bars appearing on right and bottom sides of the browser window. Thus, reload unit U40223 may also adjust the windows after the reloading. For example, reload unit U40223 may move the navigation page window according to the coordinates of the identified resource until the identified resource is presented in the independent window. Further, the size of the independent window may also be adjusted to match the size of the identified resource.

For example, when a media player embedded in a web page is playing a video, an independent window and its child temporary browser navigation page window are created. The web page is then reloaded into the independent window. The temporary browser navigation page window is also adjusted based on the coordinates of the video in the original web page. The size of the independent window is also adjusted to match the media player. Thus, the video is now presented in the independent window. The URL of the original web page and coordinates of the identified resource may be obtained using various methods explained previously.

Alternatively, after creating the independent window and its child temporary browser navigation page window, instead of reloading the entire original web page, reload unit U40223 may only reload the identified resource into the independent window based on the source code (e.g., HTML code) of the identified resource. Thus, only the identified resource is presented in the independent window. Further, if the identified resource to be presented in the independent window is a video resource played in the embedded media player, the source code may be for the corresponding embedded media player. Such source code may include the URL of the media player together with information about the video resources. The media player may derive the URL for the video resources, download the video resources, and play the download resources. Because the independent window and the original web page window co-exist, closing the independent window does not cause the original web page window to close.

Figure 6:
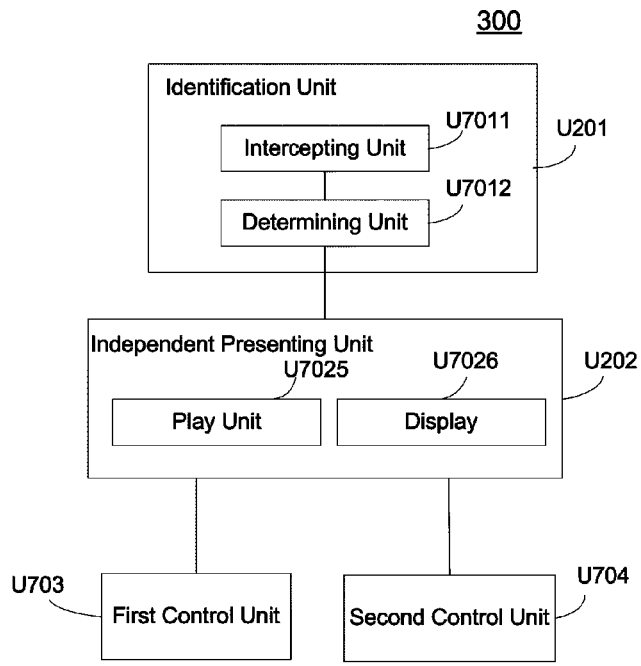
FIG. 6 illustrates another exemplary web page resource presentation module consistent with the disclosed embodiments.

However, when reloading the original web page into the independent window, for certain dynamic resources, presenting the resources in the independent window may not be synchronized with presenting the resources in the original web page window. For example, if a video is being played in the original web page window, and the video is then reloaded into the independent window, the video may be played from the beginning. FIG. 6 illustrates exemplary control mechanisms to maintain synchronization between the independent window and the original web page window.

As shown in FIG. 6, in addition to exemplary identification unit U201 and independent presenting unit U202, presentation module 300 may include a first control unit U703 and a second control unit U704. When the identified resource such as an audio or video is presented in the independent window, first control unit U703 may be used to control the speed or progress of the independent window such that the identified resource is played in the independent window in synchronization with the web page window. Further, when the identified resource such as an audio or video is presented in the independent window, second control unit U704 may be used to control the original web page window to perform certain audio or video operations, such as muting the audio, pausing the audio or video, or making the audio or video disappear.

For example, for animation, audio, and video resources being displayed or played in the original web page window, first control unit U703 may obtain status information from the original web page window or from the operating system to control the presentation in the independent window to be synchronized with the original web page window. Such synchronization may be desired for video resources. For instance, the user may initially watch a video in the original web page window and may be interested in the video. The user may choose to watch the video in the independent window synchronized with the original window. First control unit U703 may then control the independent window to play the video at the same speed and to continue from the last position played in the original web page window to improve viewing experience for the user.

The user may also choose not to watch the video in the independent window synchronized with the original window. For example, some web pages automatically play videos, and it is possible that the user watches the video only from somewhere in the middle of the video when the user starts to watch the video. Thus, it may be desired for the user to watch the video from the beginning when the video is presented in the independent window.

Further, under certain circumstances, more than one video and/or audio resources may be presented at the same time, which may cause interference for the user to watch and/or hear the video and/or audio resources. For example, if there are ten currently-opened web pages, and five of them may include identified video resources that are automatically played in independent windows, it may cause interference to the user in watching the video resources. The second control unit U704 may be configured to only allow one or a predetermined number of independent windows to be displayed, or may pause videos and/or mute audios in all independent windows except one independent window selected by the user.

Further, when identified resources are presented in the independent window, the same resources may also be displayed in the original web page window, which may cause interference for the user as well. The second control unit U704 may pause videos and/or mute audios in the original web page window or even minimize or hide the original web page window. Other operations may also be used.

When a web page contains multiple resources of the same type, such as multiple images, videos, or audios, or several web pages contain multiple resources of the same type, second control unit U704 may send the multiple resources to a single independent window one at a time or in a batch. The batch of resources may be presented by the independent window in certain configured ways. For example, the independent window may provide some graphic buttons for the user to operate on the multiple resources. With respect to the audio or video resources, the user may click the buttons, such as 'previous,' 'next' 'pause,' 'delete,' and 'add,' to operate on the audio or video resources.

With respect to image resources, the user may click the buttons, such as 'previous' and 'next' to display the image resources. Alternatively, the independent window may also display all images at the same time within the same window. In addition, the buttons may be made floating and placed close to an image currently being displayed. The user may then click on the 'previous' or 'next' button to directly go to the previous or next image based on image positioning techniques, without having to scroll or flip through the web page contents. For example, when the user is browsing an image in an Internet post. The first image may only have a 'next' button appearing close to the first image, and a click on the 'next' button may cause the display to go to the next image in the same web page or a different web page (if multiple web pages showing the same resources). Other images may have both 'previous' and 'next' buttons appearing close to the individual image being displayed.

In addition to sending the multiple resources to a single independent window, second control unit U704 may also send the multiple resources to several independent windows, and the several independent windows may present the multiple resources in layers. The user may also select one window to be at the top for displaying.

Further, some audio resources may be included in a web page without a corresponding player, such as web page background music, etc., and the user may be unable to see information about the audio resources, such as titles, lyrics and other information. Second control unit U704 may obtain such information and provide the information to the user. For example, second control unit U704 may obtain a title of an audio resource from the request sent to the server 110 from the browser, and may also search the Internet 102 to find lyrics and/or other information about the audio resource. Other methods may also be used.

In the above disclosed embodiments, the independent window is created and/or modified after the specific resources are identified. That is, the independent window may be created in real-time. Returning to FIG. 3, independent presenting unit U202 may also use a pre-generated desktop window to perform independent window processing. The pre-generated desktop window may be generated when user computer 104 starts or anytime during operation of user computer 104 by web browser software or any other appropriate software applications.

In operation, independent presenting unit U202 may use the pre-generated desktop window as the independent window, and may directly change the parent window of the web page window containing the identified specific resources from the browser window to the desktop window (i.e., the independent window). More specifically, independent presenting unit U202 may re-organize the original web page window, such as hiding other contents except the identified resources, etc. Without downloading any identified resources, independent presenting unit U202 may use functions from the operating system to change the parent window of the re-organized web page window to the pre-generated desktop window. The re-organized web page may thus be presented in the independent window (i.e., the desktop window).

The re-organization may also adjust the location and size of web page window, such that only the identified resources are presented in the independent window. Microsoft Internet Explorer (IE) is used to illustrate the re-organization process. Other browsers or software applications may also be used.

IE control has three layers of windows, the names of which (from the outside to inside) are: the container window Shell Embedding (the outermost layer); document object window Shell DocObject View (the middle layer); and the browser service window Internet Explorer_Server (the innermost window). Because the three windows have a relative inner/outer relationship (also known as the parent-child window relationship), there are some inherent properties when moving the windows relative to one another. For example, when moving an outer window, the inner window or windows move with the outer window. However, when moving an inner window, the outer window or windows do not move with the inner window.

Further, the specific resources normally are in Shell Embedding. Thus, Shell DocObject View and Internet Explorer_Server are inner windows with respect to Shell Embedding, with Internet Explorer_Server further being the inner window of Shell DocObject View. The specific resource window (i.e., Shell Embedding) is then modified to set the desktop window (the desktop of user computer 104 is also a window called a desktop window) as the parent window, and size of the specific resource window is adjusted. At the same time, the Shell DocObject View or Internet Explorer_Server may be adjusted relative to the original web page window (i.e., Shell Embedding) to present only the identified resource in the web page window, the parent window of which is already the desktop window.

When adjusting the windows, the outermost layer of the windows (i.e., the web page window containing the identified resource) is first adjusted according to the size of the identified resource. Further, the innermost window (i.e., Internet Explorer_Server) is then adjusted such that the size of the Internet Explorer_Server matches the full size of the identified resource, and moved to a particular position such that the display areas of Shell Embedding and Internet Explorer_Server match. Because the innermost layer of the windows (i.e., Internet Explorer_Server) is a child window of the outermost layer of the windows (i.e., the web page with identified resources), display areas outside the identified resource of the innermost window (i.e., Internet Explorer_Server) are blocked. The middle layer of the windows may be adjusted similarly. The user may thus only see the content of identified resource.

Of course, when an identified resource is a window-type (e.g., flash or audio and video in embedded players, etc.), the parent window of the identified resource window may be directly changed to the desktop window to present the identified resource in the independent window. However, the resource window may lack an outside frame.

In addition to using the pre-generated desktop window as the independent window, independent presenting unit U202 may also use a known media player as the independent window to present identified specific resources. The known media player may include any appropriate locally installed media player(s) by the user. Independent presenting unit U202 may choose a proper media player based on an identified resource, and use the chosen media player to download and to present the identified resource. Further, the user may also be able to select a preferred media player to present certain identified resources.

If no locally installed media player is available, or the locally installed media player does not meet the requirement of the identified resource, independent presenting unit U202 may start a built-in media player (e.g., a flash player, etc.) in the browser, and may cause the built-in media player to download and present the identified resources in the independent window. Such approach may be desired for an identified resource without a corresponding embedded player in the web page, such as web page background music, and similar other audio or video resources. Because the locally installed media player and the browser built-in media player use the desktop window as the parent window, these media players are independent windows.

Further, when the known media player (e.g., a locally installed media player or a browser built-in media player) obtains the URL of the identified resource, the known media player may automatically send request to server 110 for downloading the identified resource based on the URL, and further present the downloaded resource. Under this approach, identification unit U201 needs to determine the detailed URL of the identified resource, and independent presenting unit U202 may start the known media player and provide the detailed URL of the identified resource to the known media player. The known media player may then request, download, and present the identified resource, as previously explained.

Returning to FIG. 3, presentation module 300 may also include a page recover unit U203. When the identified resources are presented using the independent window, the original web page containing the identified resources may disappear, or the identified resources may disappear from the original web page. Page recover unit U203 may recover the original web page back to the state prior to presenting the identified resources using the independent window. For example, page recover unit U203 may change the independent window to the original web page window state, and/or may place the identified resources back to the original location within the original web page, i.e., the previous presentation state. Other recoveries may also be included. Page recover unit U203 may automatically recover the original web page or may provide a prompt to the user. The user may click on the prompt to start the page recovering process.

Figure 7:
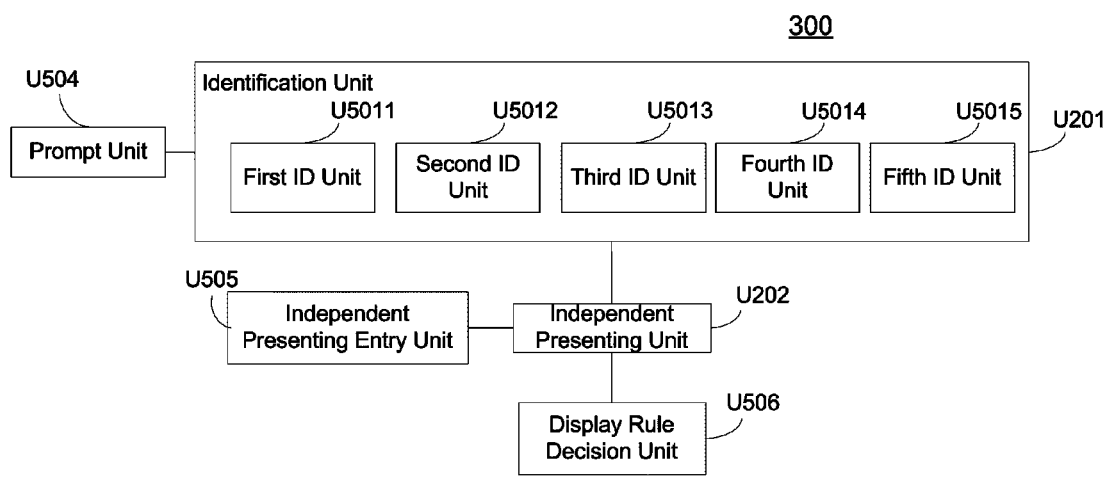
FIG. 7 illustrates another exemplary web page resource presentation module consistent with the disclosed embodiments.

FIG. 7 illustrates another exemplary configuration of presentation module 300. As shown in FIG. 7, identification unit U201 may include first identification unit U5011, second identification unit U5012, third identification unit U5013, fourth identification unit U5014, and fifth identification unit U5015 (also shown in FIG. 4B). The identified specific resources may include resources in a web page (e.g., images or background music in the specific web page); resources in one or more sub-pages of the web page; back-end transferred resources in the web page (e.g., audio and video played by a media player embedded in the web page); resources pointed to by hyperlinks within the web page; and resources in other web pages having a same theme as the web page, etc. As previously explained, first identification unit U5011 may be configured to identify specific resources of the web page, second identification unit U5012 may be configured to identify specific resources of sub-pages of the web page, third identification unit U5013 may be configured to identify specific resources back-end transferred in the web pages; fourth identification unit U5014 may be configured to identify specific resources pointed to by hyper links in the web page, and fifth identification unit U5015 may be configured to identify specific resources of other web pages having the same theme as the web page.

Thus, besides that the identified resources of the web page may be presented in the independent window, the identified resources of the sub-pages and related web pages of the specific web page can also be presented in the independent window. The user may view the identified resources without accessing the related web pages of the web page.

As previously explained, identification unit U201 may include any appropriate software and/or hardware on user computer 104. For example, identification unit U210 may include software applications running on user computer 104, such as a web browser or software modules used by the web browser.

Further, identification unit U201 is coupled to a prompt unit U504. After the various specific resources are identified by identification unit U201, prompt unit U504 may display identified resources in the original web page using a prompt or certain indicator(s) to indicate the available specific resources. Prompt unit 504 may also display any appropriate information, such as resource name, size, and even downloading address. Such information may be displayed using a prompt or one or more prompt icons at certain locations such as the browser's address bar, tab bar, toolbars, side bars, resource nearby areas, and other viewing areas. If a currently-opened web page is displaying or contains displayable resources, the prompt or prompt icons may be placed at any of the above-mentioned locations. On the other hand, if the web page containing the resource is minimized, or other windows are displaying, the user may only see the tab bar of the browser. But the user may still be able to see the prompt on the tab bar. Further, when the web page contains more than one identified resources, prompt unit U504 may use a list or a drop-down list to prompt the plurality of identified resources. To display a prompt close to the corresponding resource, prompt unit U504 may analyze the front page elements of the web page to determine coordinates of the corresponding resource in the web page, and then display the prompt based on the coordinates.

In addition to prompt the identified resources for each web page, prompt unit U504 may combine information on the identified resources of several web pages. For example, if there are five currently-opened web pages, each having a video resource, prompt unit U504 may use a drop-down list placed on the browser toolbars to display the prompt icons for these video resources. If a web page has multiple identified resources, prompt unit U504 may also combine information on the multiple identified resources for display. For example, if there is a single currently-opened web page containing five video resources, prompt unit U504 may use a drop-down list placed on the browser toolbars or a particular location within the web page to display the prompt icons for the five video resources. Other methods may also be used.

As previously explained, in operation, independent presenting unit U202 may present the identified specific resources in an independent window. Independent presenting unit U202 may be coupled with an independent presenting entry unit U505 and a display rule decision unit U506. Further, independent presenting unit U202 may present the identified resource in one of an active mode and a passive mode. In the active mode, display rule decision unit U506 may first determine whether one or more preset active display rules are satisfied based on certain criteria. When one or more preset rules are satisfied, independent presenting unit U202 automatically presents the identified resource in the independent window for the user.

Further, active display rules may be set by the user or user computer 104 based on specific requirements. For example, an active display rule may be set to "active presenting any resources identified," "active presenting if only one window is currently opened," or "active presenting if the identified resource meets a preconfigured condition," etc. Any appropriate rules may be used. The active display may be desired for playing advertising pages.

In the passive mode, independent presenting entry unit U505 may provide an entry interface for presenting the identified resources. The entry interface may be provided to the user, and the user can then request which resource to present through the entry interface. That is, after the specific resources are identified, the identified resources are not immediately presented in an independent window. Instead, the identified resources are prompted by prompt unit U504 to the user, and the entry interface is also displayed to the user for the user to select one or more identified resources to be presented. After the user enters selected resource(s), independent presenting unit U202 may then start the independent window creation and processing process to present the selected resource(s) in the independent window.

Further, the entry interface may be provided separately on the web page. For example, for a video resource, the entry interface may be displayed in the video display area. Alternatively, the prompt icons may be used as the entry interface. The user can click on a particular prompt icon to select the corresponding identified resource, and to cause the corresponding resource presented in an independent window.

Figure 8:
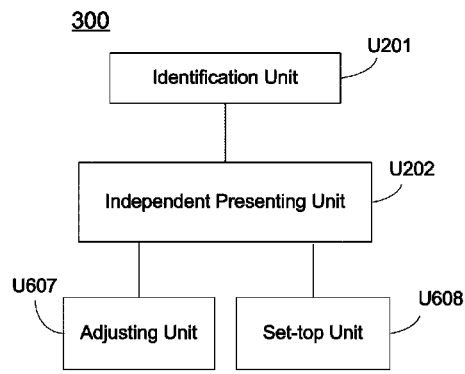
FIG. 8 illustrates another exemplary web page resource presentation module consistent with the disclosed embodiments.

FIG. 8 illustrates another exemplary configuration of presentation module 300. As shown in FIG. 8, in addition to identification unit U201 and independent presenting unit U202, presentation module 300 may also include an adjusting unit U607 and a set-top unit U608. In operation, when an identified resource is presented in an independent window, adjusting unit U607 may perform zoom operation on or change position of the resource presented in the independent window, or may change the size and location of the independent window. For example, the initial size and location of the independent window may be the same as those of the original web page. If the size of the independent window is sufficiently large, it may be difficult for the user to see other web pages. Adjusting unit U607 may reduce the size of the independent window and/or move the independent window to a side location of the display screen, such as the upper left corner of the display screen.

Further, set-top unit U608 may use certain functions from the operating system to set the independent window to the top of the display screen such that the independent window is always visible, even when the user switches to other windows. The user may then be able to browse other web pages while watching the video being presented in the independent window. The user may also perform the above operations manually.

Figure 9:
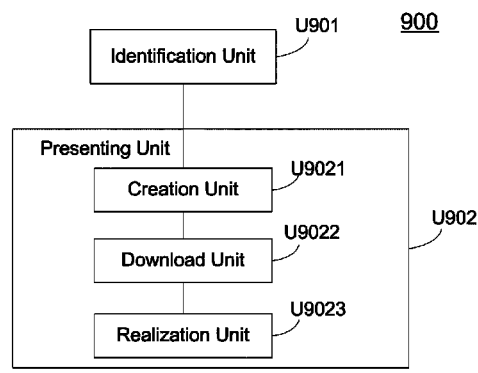
FIG. 9 illustrates another exemplary web page resource presentation module consistent with the disclosed embodiments.

FIG. 9 illustrates another exemplary specific resource presentation module 900 consistent with the disclosed embodiments. As shown in FIG. 9, presentation module 900 includes an identification unit U901 and a presenting unit U902. Presenting unit U902 may also include a creation unit U9021, a download unit U9022, and a realization unit U9023. Certain components may be omitted and other components may also be included.

Identification unit U901 may be similar to identification unit U201 in FIG. 3, and descriptions of identification unit U901 may be omitted. In operation, after one or more specific resources are identified in an original web page window by identification unit U901, creation unit U9021 may use certain functions of the operating system to create a presentation window with the browser being the parent window of the presentation window. That is, the presentation window is a child window of the browser.

Further, download unit U9022 may download the identified resources using the URL or URLs of the identified resources, and realization unit U9023 may present the downloaded resources in the presentation window. Equivalently, the presentation window may be viewed as a cutout window from the original web page window, and is able to send request to server 110 to download the identified resources and to present the identified resources. For example, for a video resource played by a media player embedded in the original web page containing the video resource, the presentation window (with the browser as the parent window) may first request server 110 to download the media player in the original web page. The downloaded media player may then download the video resource. Thus, the video resource can be presented in the presentation window.

Presenting the resources in the presentation window is different from playing the resources by the media player embedded in the original web page window. For example, although the embedded media player is a child window of the original web page window, this type of child window has the original web page window as the parent window. Thus, when the original web page window is closed, the child window (i.e., the embedded media player window) is also closed together with the original web page window, and the resources can no longer be presented.

However, the presentation window has the browser as the parent window, and is at the same level as other web page windows in the browser (the web page window is also a child window of the browser). Thus, when the original web page window is closed, the presentation window is not impacted and the resources can still be presented in the presentation window. However, when the browser is closed, the presentation window is also closed together with the browser. Further, the operations and other aspects of presentation module 900 are similar to those of presentation module 300, and are thus omitted.

The disclosed systems and methods may provide many advantageous browser and other software applications in a variety of network or client environments, such as in personal computer equipment and the like, mobile phones, mobile communication devices, personal digital assistants (PDAs) and other electronic equipment. For example, by using various independent windows to present specific resources, the user may have significantly more control and more flexible control over the resources presented, and the user experience may be greatly improved by using the disclosed methods and systems, especially when browsing the Internet. Therefore, the utilization efficiency of the Internet resources is also improved. Other applications and advantages are obvious to those skilled in the art.

What is claimed is:

1. A method for presenting specific resources on a computer having a web browser, comprising:
   accessing by the web browser a specific resource related to an original web page from a web server;
   obtaining attribute information of the specific resource;
   identifying the specific resource related to the original web page based on the obtained attribute information of the specific resource;
   obtaining an independent window being independent from at least a web page window displaying the original web page; and
   presenting the identified specific resource in the independent window,
   wherein presenting the identified specific resource further includes:
      when the specific resource is a window-type resource with a resource window, changing the resource window to have the independent window as a parent window of the resource window; and
      presenting the specific resource in the independent window.

2. The method according to claim 1, wherein:
   the specific resource is one or more of a video resource, an audio resource, an image resource, an animation resource, and text resource.

3. The method according to claim 1, further including:
   stopping presenting the specific resource in the independent window; and
   recovering the original web page in the web page window to present the specific resource.

4. The method according to claim 1, wherein obtaining the attribute information further includes:
   intercepting a request sent to the web server from one of the web browser and a media player embedded in the web browser;
   finding a uniform resource locator (URL) corresponding to the specific resource based on the intercepted request; and
   determining the attribute information based on a suffix of the URL.

5. The method according to claim 1, wherein obtaining the attribute information further includes:
   intercepting a response sent from the web server to one of the web browser and a media player embedded in the web browser and containing a response header and data contents; and
   determining the attribute information based on the data contents corresponding to the specific resource.

6. The method according to claim 1, wherein identifying the specific resource further includes one or more of:
   identifying the specific resource associated with the original web page;
   identifying the specific resource associated with a sub-page of the original web page;
   identifying the specific resource being back-end transferred in the original web page;
   identifying the specific resource being pointed to by a hyper link in the original web page; and
   identifying the specific resource associated with another web page having a same theme as the original web page.

7. The method according to claim 1, wherein obtaining the independent window further includes:
   creating the independent window as one of a desktop window, a dialog-box form floating window, and a window with a desktop of the computer as a parent window and being independent from the web browser and the web page window.

8. The method according to claim 1, wherein obtaining the independent window further includes:
   obtaining a pre-generated desktop window as the independent window, independent from the web browser and the web page window.

9. The method according to claim 1, wherein obtaining the independent window further includes:
   determining a known media player on the computer, wherein the known media player is one of a locally installed media player and a built-in media player of the web browser; and
   using the known media player as the independent window, independent from the web browser and the web page window.

10. The method according to claim 1, wherein presenting the identified specific resource further includes:
    changing the web page window to have the independent window as a parent window of the web page window; and re-organizing the independent window and the web page window such that only the specific resource is presented in the independent window.

11. The method according to claim 10, wherein re-organizing includes:
adjusting a size and position of the independent window based on coordinates of the specific resource determined based on a front-element analysis.

12. The method according to claim 7, further including:
creating a temporary browser navigation page window with the independent window as a parent window; and
reloading the original web page from the web server to the navigation page window such that the specific resource in the original web page is presented in the independent window.

13. The method according to claim 12, further including:
synchronizing the independent window with the web page window with respect to presenting the specific resource.

14. The method according to claim 7, further including:
creating a temporary browser navigation page window with the independent window as the parent window; and
reloading only the specific resource from the web server to the navigation page window such that the specific resource in the web page is presented in the independent window.

15. The method according to claim 7, further including:
setting the independent window as a top window such that the independent window is not blocked by other windows.

16. The method according to claim 6, further including:
prompting a user of the computer about a plurality of available specific resources using one or more prompt icons.

17. The method according to claim 1, further including:
determining a display mode from one of an active display mode and a passive display mode; and
presenting the specific resource in the independent window based on the determined display mode.

18. The method according to claim 17, further including:
when the display mode is an active mode and one or more active display rules are satisfied, automatically presenting the specific resource in the independent window after the specific resource is identified.

19. The method according to claim 17, further including:
when the display mode is a passive mode, providing a rule entry interface for a user of the computer to enter an instruction; and
presenting the specific resource in the independent window based on the instruction entered by the user.

20. A non-transitory computer-readable medium containing executable computer programs, when executed by a computer having a web browser, performing a method for presenting specific resources on the computer, the method comprising:
accessing by the web browser a specific resource related to an original web page from a web server;
obtaining attribute information of the specific resource;
identifying the specific resource related to the original web page based on the obtained attribute information of the specific resource;
obtaining an independent window being independent from at least a web page window displaying the original web page; and
presenting the identified specific resource in the independent window,
wherein presenting the identified specific resource further includes:
when the specific resource is a window-type resource with a resource window, changing the resource window to have the independent window as a parent window of the resource window; and
presenting the specific resource in the independent window.

21. The non-transitory computer-readable medium according to claim 20, wherein:
the specific resource is one or more of a video resource, an audio resource, an image resource, an animation resource, and text resource.

22. The non-transitory computer-readable medium according to claim 20, the method further including:
stopping presenting the specific resource in the independent window; and
recovering the original web page in the web page window to present the specific resource.

23. The non-transitory computer-readable medium according to claim 20, wherein obtaining the attribute information further includes:
intercepting a request sent to the web server from one of the web browser and a media player embedded in the web browser;
finding a uniform resource locator (URL) corresponding to the specific resource based on the intercepted request; and
determining the attribute information based on a suffix of the URL.

24. The non-transitory computer-readable medium according to claim 20, wherein obtaining the attribute information further includes:
intercepting a response sent from the web server to one of the web browser and a media player embedded in the web browser and containing a response header and data contents; and
determining the attribute information based on the data contents corresponding to the specific resource.

25. The non-transitory computer-readable medium according to claim 20, wherein identifying the specific resource further includes one or more of:
identifying the specific resource associated with the original web page;
identifying the specific resource associated with a sub-page of the original web page;
identifying the specific resource being transferred at a back-end of the original web page;
identifying the specific resource being pointed to by a hyper link in the original web page; and
identifying the specific resource associated with another web page with a same subject as the original web page.

26. The non-transitory computer-readable medium according to claim 20, wherein obtaining the independent window further includes:
creating the independent window as one of a desktop window, a dialog-box form floating window, and a window with a desktop of the computer as a parent window and being independent from the web browser and the web page window.

27. The non-transitory computer-readable medium according to claim 20, wherein obtaining the independent window further includes:
obtaining a pre-generated desktop window as the independent window, independent from the web browser and the web page window.

28. The non-transitory computer-readable medium according to claim 20, wherein obtaining the independent window further includes:

determining a known media player on the computer, wherein the known media player is one of a locally installed media player and a built-in media player of the web browser; and using the known media player as the independent window, independent from the web browser and the web page window.

29. The non-transitory computer-readable medium according to claim 20, wherein presenting the identified specific resource further includes:

changing the web page window to have the independent window as a parent window of the web page window; and re-organizing the independent window and the web page window such that only the specific resource is presented in the independent window.

30. The non-transitory computer-readable medium according to claim 29, wherein re-organizing includes:

adjusting a size and position of the independent window based on coordinates of the specific resource determined based on a front-element analysis.

31. The non-transitory computer-readable medium according to claim 26, the method further including:

creating a temporary browser navigation page window with the independent window as a parent window; and reloading the original web page from the web server to the navigation page window such that the specific resource related to the original web page is presented in the independent window.

32. The non-transitory computer-readable medium according to claim 31, the method further including:

synchronizing the independent window with the web page window with respect to presenting the specific resource.

33. The non-transitory computer-readable medium according to claim 26, the method further including:

creating a temporary browser navigation page window with the independent window as the parent window; and reloading only the specific resource from the web server to the navigation page window such that the specific resource in the web page is presented in the independent window.

34. The non-transitory computer-readable medium according to claim 26, the method further including:

setting the independent window as a top window such that the independent window is not blocked by other windows.

35. The non-transitory computer-readable medium according to claim 25, the method further including:

prompting a user of the computer about a plurality of available specific resources using one or more prompt icons.

36. The non-transitory computer-readable medium according to claim 20, the method further including:

determining a display mode from one of an active display mode and a passive display mode; and presenting the specific resource in the independent window based on the determined display mode.

37. The non-transitory computer-readable medium according to claim 36, the method further including:

when the display mode is an active mode and one or more active display rules are satisfied, automatically presenting the specific resource in the independent window after the specific resource is identified.

38. The non-transitory computer-readable medium according to claim 36, the method further including:

when the display mode is a passive mode, providing a rule entry interface for a user of the computer to enter an instruction; and presenting the specific resource in the independent window based on the instruction entered by the user.

* * * * *